United States Patent

Marwah et al.

(10) Patent No.: US 9,632,602 B2
(45) Date of Patent: Apr. 25, 2017

(54) FABRIC LAMINATED TOUCH INPUT DEVICE

(71) Applicant: Microsoft Technology Licensing, LLC, Redmond, WA (US)

(72) Inventors: Rahul Marwah, Seattle, WA (US); Christopher H. Kujawski, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 14/532,204

(22) Filed: Nov. 4, 2014

(65) Prior Publication Data

US 2016/0124531 A1 May 5, 2016

(51) Int. Cl.
| | |
|---|---|
| *G06F 3/0354* | (2013.01) |
| *G06F 3/033* | (2013.01) |
| *G06F 3/01* | (2006.01) |
| *G06F 1/16* | (2006.01) |
| *G06F 3/02* | (2006.01) |
| *G06F 3/041* | (2006.01) |

(52) U.S. Cl.
CPC .......... *G06F 3/03547* (2013.01); *G06F 1/163* (2013.01); *G06F 1/169* (2013.01); *G06F 1/1643* (2013.01); *G06F 3/016* (2013.01); *G06F 3/0202* (2013.01); *G06F 3/033* (2013.01); *G06F 3/0414* (2013.01); *G06F 3/041* (2013.01)

(58) Field of Classification Search
None
See application file for complete search history.

(56) References Cited

U.S. PATENT DOCUMENTS

| 5,854,625 | A | 12/1998 | Frisch et al. | |
|---|---|---|---|---|
| 8,044,942 | B1 * | 10/2011 | Leonhard | G06F 1/1637 345/173 |
| 8,384,674 | B1 | 2/2013 | Slothower et al. | |
| 8,866,752 | B2 * | 10/2014 | Westerman | G06F 3/0235 345/173 |
| 8,982,051 | B2 * | 3/2015 | Rosenfeld | G06F 3/03543 345/163 |
| 9,116,569 | B2 * | 8/2015 | Stacy | G06F 3/016 |
| 9,158,383 | B2 * | 10/2015 | Shaw | G06F 1/1618 |
| 9,411,380 | B2 * | 8/2016 | Farahani | G06F 1/1656 |
| 2006/0197753 | A1 * | 9/2006 | Hotelling | G06F 1/1626 345/173 |

(Continued)

FOREIGN PATENT DOCUMENTS

| GB | 2464584 | 4/2010 |
|---|---|---|
| WO | WO-2013142468 | 9/2013 |

OTHER PUBLICATIONS

"International Search Report and Written Opinion", Application No. PCT/US2015/058694, Jan. 25, 2016, 14 Pages.

(Continued)

*Primary Examiner* — Dismery Mercedes

(57) ABSTRACT

Techniques for fabric laminated touch input device are described. In at least some embodiments, a touch input device is mounted to a chassis of an apparatus. The touch input device and the chassis are laminated with a fabric layer, such as by adhering a portion of fabric over the chassis and the touch input device to enclose the touch input device beneath the fabric layer. According to one or more embodiments, a touch input device laminated with fabric can support different types of touch input, such click input for object selection, touch input for object movement, and so forth.

20 Claims, 13 Drawing Sheets

(56) References Cited

U.S. PATENT DOCUMENTS

| | | | |
|---|---|---|---|
| 2007/0129046 A1* | 6/2007 | Soh | H04M 1/23 455/403 |
| 2010/0052880 A1* | 3/2010 | Laitinen | G06F 3/016 340/407.2 |
| 2010/0088596 A1* | 4/2010 | Griffin | G06F 3/041 715/702 |
| 2010/0088654 A1* | 4/2010 | Henhoeffer | G06F 3/04883 715/863 |
| 2010/0128002 A1* | 5/2010 | Stacy | G06F 3/016 345/174 |
| 2010/0156818 A1* | 6/2010 | Burrough | G06F 3/016 345/173 |
| 2010/0156823 A1* | 6/2010 | Paleczny | G06F 3/041 345/173 |
| 2011/0051334 A1 | 3/2011 | Griffith et al. | |
| 2011/0141052 A1* | 6/2011 | Bernstein | G06F 3/016 345/174 |
| 2012/0068957 A1* | 3/2012 | Puskarich | G06F 3/016 345/174 |
| 2013/0229347 A1* | 9/2013 | Lutz, III | G06F 1/1618 345/163 |
| 2013/0229759 A1* | 9/2013 | Whitt, III | G06F 1/1618 361/679.08 |
| 2015/0116205 A1* | 4/2015 | Westerman | G06F 3/016 345/156 |

OTHER PUBLICATIONS

"Magic Trackpad", Retrieved From: <https://www.apple.com/magictrackpad/> May 14, 2014, Jul. 28, 2010, 3 Pages.

"Mobee Magic Numpad for Apple Magic Trackpad", Retrieved From: <http://store.apple.com/us/product/H7657VC/A/mobee-magic-numpad-for-apple-magic-trackpad > Jun. 12, 2014, Jan. 8, 2012, 4 Pages.

"Synaptics ForcePad: A Thinner, Pressure Sensitive Trackpad for Notebooks", Retrieved From: <http://www.synaptics.com/en/forcepad-series-4.php#info_content> May 14, 2014, 3 Pages.

"Touchpad Overlays", Retrieved From:<http://www.cirque.com/solutions/oemtouchpads/touchpadoverlays.aspx> May 14, 2014, Jul. 9, 2009, 1 Page.

"Touchpad: A Built-In Mouse", Retrieved From: <http://www.microsoft.com/surface/en-us/support/hardware-and-drivers/touchpad-a-builtin-mouse > May 14, 2014, Oct. 19, 2013, 6 Pages.

Shimpi, "AnandTech: Synaptics ForcePad: A Thinner, Pressure Sensitive Trackpad for Notebooks", Retrieved From: <http://www.anandtech.com/show/6171/synaptics-forcepad-a-thinner-pressure-sensitive-trackpad-for-notebooks> Jun. 12, 2014, Aug. 20, 2012, 6 Pages.

"International Preliminary Report on Patentability Issued in PCT Application No. PCT/US2015/058694", Mailed Date: Oct. 5, 2016, 7 Pages.

\* cited by examiner

FABRIC LAMINATED TOUCH INPUT DEVICE

BACKGROUND

Mobile devices today are manufactured according to a variety of different form factors. For example, a user may interact with a mobile phone, tablet computer, or other mobile computing device to check email, surf the web, compose texts, interact with applications, and so on. Typical mobile devices, however, are manufactured from materials which may be uncomfortable to hold and/or physically interact with over extended periods of time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for fabric laminated touch input device are described. In at least some embodiments, a touch input device is mounted to a chassis of an apparatus. The touch input device and the chassis are laminated with a fabric layer, such as by adhering a portion of fabric over the chassis and the touch input device to enclose the touch input device beneath the fabric layer. According to one or more embodiments, a touch input device laminated with fabric can support different types of touch input, such click input for object selection, touch input for object movement, and so forth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
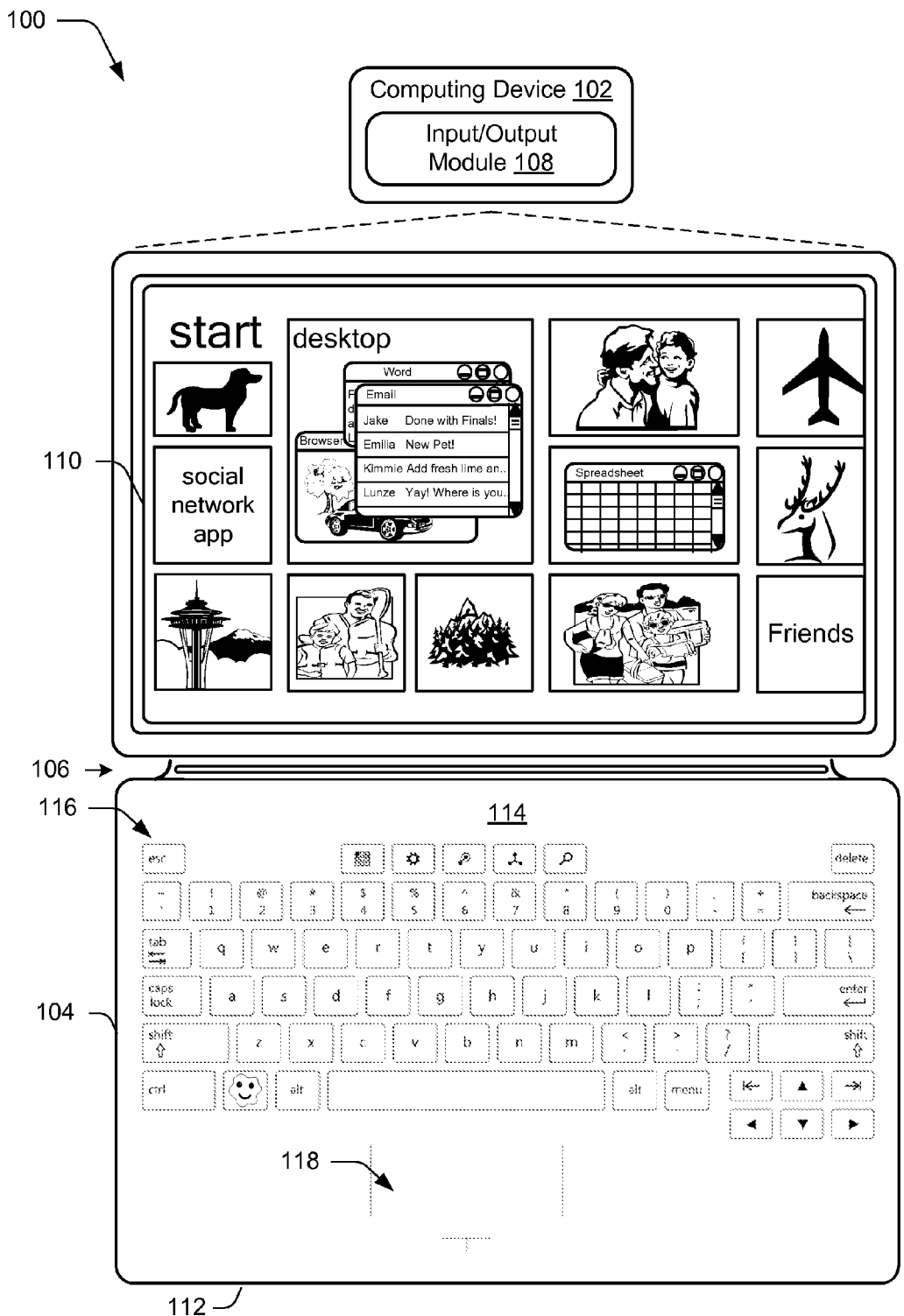
FIG. 1 is an illustration of an example device that is operable to employ techniques described herein in accordance with one or more embodiments.

Techniques for fabric laminated touch input device are described. In at least some implementations, a touch input device (e.g., a touchpad, a trackpad, and so forth) is mounted within a chassis of an apparatus, such as a computing device, an input device (e.g., a keyboard), and so forth. The touch input device and the chassis are laminated with a fabric layer, such as by adhering portion of fabric over the chassis and the touch input device to enclose the touch input device beneath the fabric layer.

Generally, lamination of fabric to a touch input device and portions of an associated apparatus can enhance a user experience in a variety of ways. For instance, consider a device that may be used in handheld scenarios, such as a tablet computer, and smartphone, and so forth. Typically, a chassis of such as device is fabricated from a rigid material, such as metal, metal alloys, plastic, and so forth. Laminating the chassis with fabric enables a more comfortable handheld user experience than a metallic or plastic material. Further, fabric may be less slippery and thus reduce the likelihood that a device will slip from a user's hand and be dropped.

Fabric lamination may also dampen vibration of components of a device. For instance, fabric may absorb and/or disperse vibrations, such as during movement of a moveable component. This can reduce noise caused by vibrations that may occur during movement of a moveable component. This may also decrease user annoyance and discomfort that may result from physically perceptible vibrations.

Fabric may also aid in heat dissipation. For instance, devices often produce heat, such as from operation of various electrical components. Thus, a fabric layer may absorb heat and enable heat to be dissipated over a larger surface, thus reducing hotspots and aiding in device cooling.

According to one or more implementations, a touch input device laminated with fabric can support different types of touch input. For instance, if touch input to the fabric layer overlaying the touch input device exceeds a threshold force, a switch may be actuated such that a click input event is generated. In at least some implementations, actuation of the switch produces an audible click and/or snap that provides audible feedback that the switch is actuated and a click input event is generated.

According to various implementations, if touch input to the fabric layer overlaying the touch input device does not exceed a threshold force, a touch input event is generated. For instance, touch input that does not exceed the threshold force does not cause the switch to be actuated, and thus a click input device is not generated. Generally, a click input event and a touch input event can be associated with different types of input. For instance, a touch input event may be employed for movement, such as for moving a cursor on a screen, dragging visual objects that are displayed on a screen, and so forth. A click input event may be employed for other purposes, such as for selecting selectable items. Thus, implementations provide a fabric laminated touch input device that supports different types of touch-related input.

In the following discussion, an example device is first described that may employ the techniques described herein. Implementations discussed herein, however, are not limited to the example device. Next, a section titled "Example Orientations" describes some example device orientations in accordance with one or more implementations. Following this, a section titled "Example Implementations" describes example implementation scenarios for fabric laminated touch input device in accordance with one or more implementations. Finally, an example system and device are discussed that may implement various techniques described herein.

Example Environment

FIG. 1 is an illustration of an environment 100 in an example implementation that is operable to employ techniques for fabric laminated touch input device described herein. The illustrated environment 100 includes an example of a computing device 102 that is physically and communicatively coupled to an input device 104 via a flexible hinge 106. In this particular example, the computing device 102 is configured as a tablet computing device. This is not intended to be limiting, however, and the computing device 102 may be configured in a variety of other ways, such as a mobile phone, a wearable device, a desktop computing device, a gaming apparatus, and so on. Thus, the computing device 102 may range from full resource devices with substantial memory and processor resources, to a low-resource device with limited memory and/or processing resources. An example implementation of the computing device 102 is discussed below with reference to FIG. 17.

The computing device 102 is illustrated as including an input/output module 108, which is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by the display device 110 to identify touch gestures and cause operations to be performed that correspond to the touch gestures that may be recognized through the input device 104 and/or touchscreen functionality of the display device 110, and so forth. Thus, the input/output module 108 may support a variety of different input techniques by recognizing and leveraging a division between types of inputs including key presses, touch gestures, touchless gestures recognized via a camera functionality of the computing device 102, and so on.

In the illustrated example, the input device 104 is configured as having a chassis 112 with a top surface 114. The top surface 114 includes input portions that include a keyboard 116 having an arrangement of keys and a touch input device 118. The example arrangement is presented for purpose of example only, and other arrangements and positions for the keyboard 116 and the touch input device 118 are also contemplated. Further, other non-conventional configurations are also contemplated, such as a game controller, configuration to mimic a musical instrument, and so forth. Thus, the input device 104, the keyboard 116, and/or the touch input device 118 may assume a variety of different configurations to support a variety of different functionality. In the discussion herein, the touch input device 118 may alternately be referred to and/or implemented as a touch input sensor.

The touch input device 118 generally represents various types of input devices, such as a touchpad, a trackpad, and/or other device via which tactile input can be provided. For instance, a user may provide input to the touch input device using a finger, a stylus, a pen, and/or other device via which contact with the touch input device 118 may be provided.

Although the touch input device 118 is illustrated as being associated with other device components (e.g., the keyboard 116), this is not to be construed as limiting. For instance, in at least some implementations, the touch input device 118 may be implemented separately from the input device 104, such as a modular input device that may be communicatively coupled to a device via a wired and/or wireless connection. The touch input device 118, for instance, may be implemented as an external peripheral device that may be communicatively coupled and uncoupled from various different devices. Alternatively or additionally, the touch input device 118 may be implemented as a separate installable unit that may be manufactured separately from the input device 104. In such implementations, the touch input device 118 may be operably attached (e.g., soldered) to a variety of different devices to provide touch input functionality.

According to various implementations, the input device 104 is manufactured from a particular material, such as instances and/or combinations of plastic, metal, various alloys, carbon fiber, and so forth. Further, various portions of the top surface 114 are laminated with a fabric layer. In at least some implementations, the entire top surface 114 is laminated with a fabric layer that covers the keyboard 116 and the touch input device 118. The fabric, for instance, may be a continuous sheet of fabric that is laminated to cover the top surface 114. According to one or more implementations, the fabric may include multiple individual layers of fabric material(s) that are laminated together to form an integrated fabric layer.

Examples of materials that may be used for the fabric layer include fabrics made from natural materials (e.g., cotton, silk, wool, linen, and so forth), fabrics made from synthetic materials (e.g., nylon, polyester, aramid, carbon fiber, and so forth), and combinations thereof. These examples are not to be construed as limiting, and a variety of other types and instances of fabrics may be employed in accordance with the claimed implementations. Generally, a fabric layer represents a layer of flexible material that may be formed from various type and/or combinations of materials.

According to various implementations, the keys of the keyboard 116 include key visualizations that are visual representations of keys that are printed and/or etched on the fabric layer of the top surface 114. Beneath the fabric layer is a sensor substrate that includes a plurality of pressure sensitive keys. For instance, individual of the key visualizations identify a location of a corresponding pressure sensitive key that is beneath the fabric layer. Thus, the key visualizations enable a user to locate and actuate the appropriate pressure sensitive keys by pressing on the corresponding regions of the fabric layer.

In one or more implementations, the touch input device 118 is mounted to the input device 104 beneath the fabric layer and can receive user input, such as via capacitive or other sensors that are configured to detect physical touch. Thus, the touch input device 118 itself may not be visible due to being laminated with the fabric. However, various visual indicia may be used to indicate a location of the touch input device 118 such that a user may provide input to the touch input device 118. For instance, a portion of fabric that overlays the touch input device 118 may be colored, shaded, textured, and so forth, differently than other portions of the fabric to visually identify the location of the underlying track pad. This is not intended to be limiting, however, and in at least some implementations the fabric overlaying the touch input device 118 may be such that the location of the touch input device 118 is not visually discernable. Further implementations and variations of the touch input device 118 and the overlaying fabric layer are discussed below.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

It is to be appreciated that the various devices and components illustrated in the accompanying drawings are not necessarily illustrated to scale. Thus, the various dimensions, positional relationships, and/or operational relationships between the different devices and components illustrated in the accompanying drawings are not to be construed as limiting on the claimed embodiments.

Have introduced the computing device 102, consider now a discussion of some example orientations of the computing device 102 in accordance with one or more implementations.

Example Orientations

Figure 2:
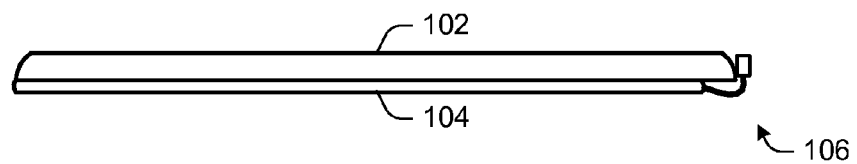
FIG. 2 depicts an example orientation a support component in a closed position in accordance with one or more embodiments.

According to various embodiments, a variety of different orientations of the computing device 102 are supported. For example, rotational movement may be supported by the flexible hinge 106 such that the input device 104 may be placed against the display device 110 of the computing device 102 and thereby act as a cover as shown in the example orientation 200 of FIG. 2. Thus, the input device 104 may act to protect the display device 110 of the computing device 102 from harm.

Figure 3:
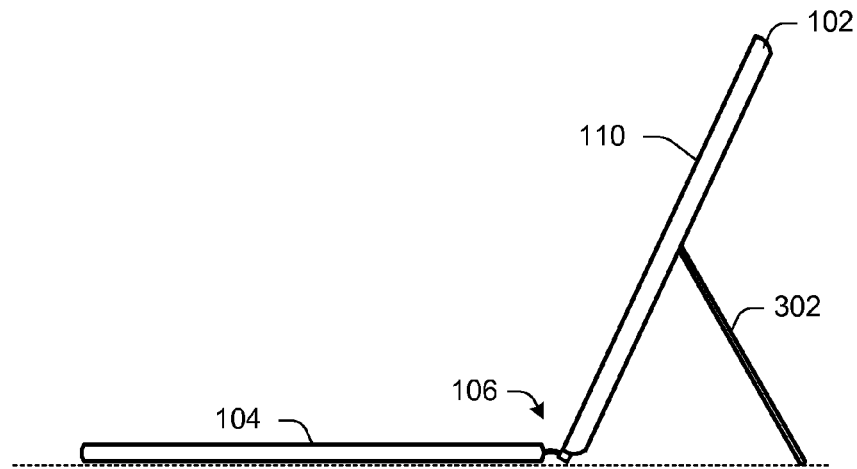
FIG. 3 depicts an example orientation a support component in an open position in accordance with one or more embodiments.

As shown in the example orientation 300 of FIG. 3, a typing arrangement may be supported. In this orientation, the input device 104 is laid flat against a surface and the computing device 102 is disposed at an angle to permit viewing of the display device 110, e.g., such as through use of a kickstand 302 disposed on a rear surface of the computing device 102. Generally, the kickstand 302 represents a support component that enables a variety of different orientations for the computing device 102. The kickstand 302, for instance, is rotatably attached to the computing device 102 to enable the kickstand 302, and thus the computing device 102, to assume a variety of different orientations such that different operating scenarios are supported.

Naturally, a variety of other orientations other than those expressly illustrated and discussed herein are also supported.

Example Implementations

This section discusses some example implementations for fabric laminated touch input device in accordance with one or more implementations.

Figure 4:
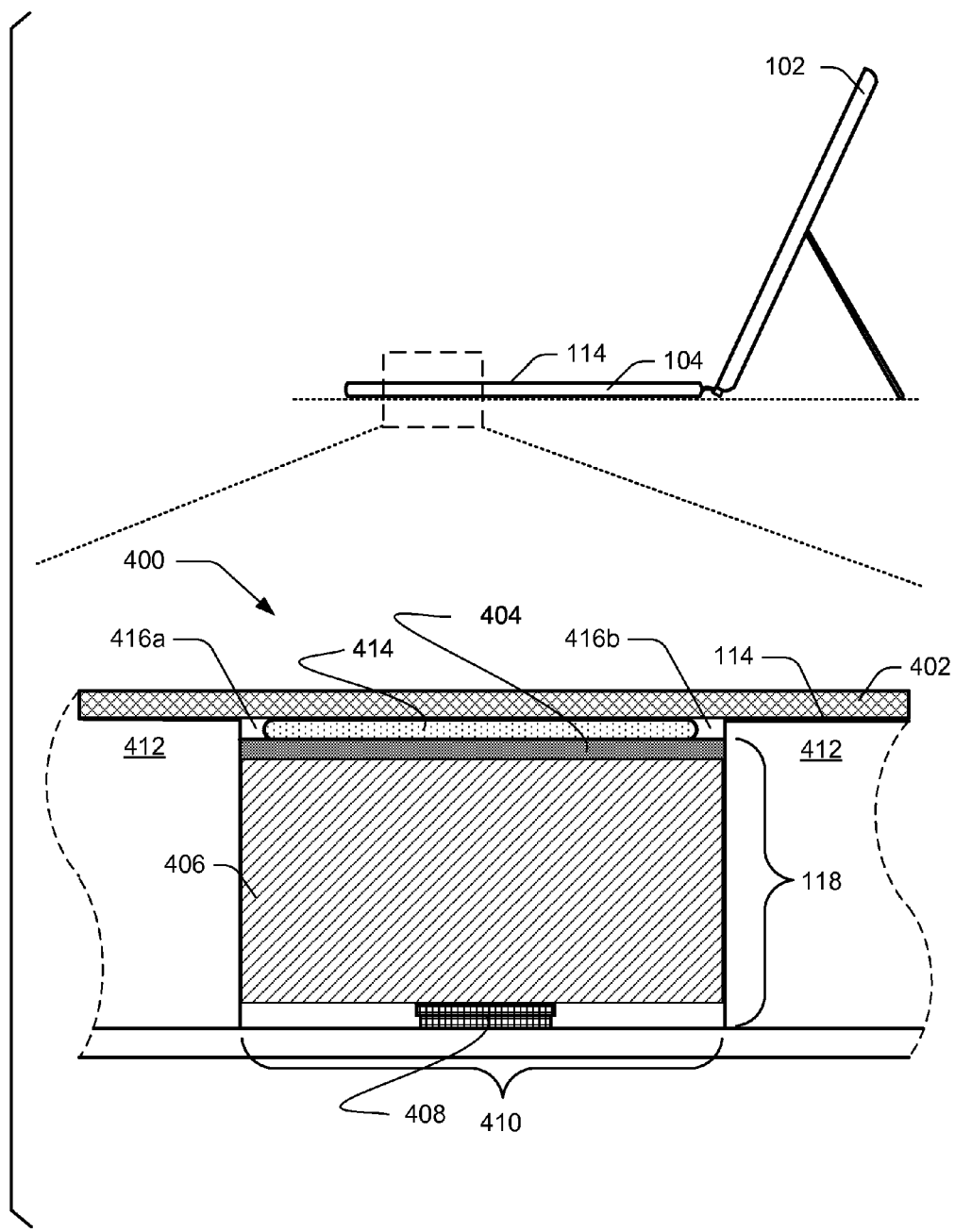
FIG. 4 depicts an example side view of a computing device with a touch input device in accordance with one or more embodiments.

FIG. 4 illustrates a side view of the computing device 102 and the input device 104. Further illustrated is a side section view 400 of the input device 104, including the touch input device 118 laminated with a fabric layer 402. The touch input device 118 includes a sensor substrate 404, sensor circuitry 406, and a switch 408. The touch input device 118 is mounted within a mounting cavity 410 of the input device 104. In at least some implementations, the switch 408 is attached to the sensor circuitry 406 and thus is movable along with other components of the touch input device 118. Alternatively, the switch may be attached to a bottom portion of the mounting cavity 410 and not to the sensor circuitry 406. In yet another implementation, the switch 408 may be attached to both the sensor circuitry 406 and a bottom portion of the mounting cavity 410.

Surrounding the mounting cavity 410 is a bezel 412 that represents surface portions of the input device 104 that surround the touch input device 118. The bezel 412, for instance, represents portions of a chassis of the input device 104 on which a user may rest their hands when interacting with the input device 104. The mounting cavity 410 represents a perforation in the bezel 412 that enables the touch input device 118 to be mounted within the input device 104.

According to various implementations, the fabric layer 402 is a layer of fabric that is laminated over the top surface 114 of the input device 104. The fabric layer 402 may be laminated to the top surface 114 using any suitable lamination and/or attachment technique, such as using an adhesive, thermal lamination, electrostatic attachment, mechanical attachment, and so forth. According to one or more implementations, the fabric layer 402 may include a single sheet of fabric, or multiple sheets of fabric layered together to form the fabric layer 402.

In at least some implementations, the fabric layer 402 is not removable once laminated to the computing device 102, and thus is different and distinct from a removable cover. Thus, techniques provide a single integrated apparatus including a fabric layer laminated to one or more outer surfaces of the apparatus. This provides a variety of benefits over a removable cover, including those of a low profile fabric layer that is lighter than a typical removable cover.

Further, in at least some implementations the fabric layer 402 may completely cover the touch input device 118 such that the touch input device 118 is sealed within the chassis of the input device 104. This provides a number of benefits as compared to open touch input device implementations, such as protecting the touch input device 118 from external contaminates, reducing wear on the sensor substrate 404, and so forth. According to one or more implementations, the fabric layer 402 may be formed from a water-resistant and/or waterproof material. Thus, the fabric layer 402 may protect internal components of the input device 104 from moisture damage.

The fabric layer 402 is also laminated to the touch input device 118 via an adhesive layer 414 that adheres the fabric layer 402 to the sensor substrate 404. The adhesive layer 414 may be formed using any suitable adhesive and/or adhesive technique, such as a pressure sensitive adhesive (PSA), a contact adhesive, a multi-part adhesive, and so forth.

Notice that in this particular implementation there is a gap portion 416a and a gap portion 416b between the fabric layer 402 and the sensor substrate 404. The gap portions 416a, 416b, for instance, represent gaps between respective edges of the adhesive layer 414 and adjacent edges of the bezel 412. For example, in at least some implementations the adhesive layer 414 is formed such that is does cover the entire surface of the sensor substrate 404.

According to various implementations, the gap portions 416a, 416b represent different respective gaps between the fabric layer 402 and the sensor substrate 404. Alternatively, the gap portions 416a, 416b represent different portions of the same gap between the fabric layer 402 and the sensor substrate 404. Further details concerning the gap portions 416a, 416b are discussed below.

In at least some implementations, one or more of the gap portions 416a, 416b represent portions of the sensor substrate 404 where no adhesive layer 414 is present, e.g., where adhesive is omitted. Alternatively or additionally, one or more of the gap portions 416a, 416b represent portions of the sensor substrate 404 where the periphery of the adhesive layer 414 is thinner than one or more inner portions of the adhesive layer 414. Thus, according to one or more implementations, the thickness of the adhesive layer 414 may be varied between its edges (e.g., adjacent the gap portions 416a, 416b) and its inner portions to provide different touch responsiveness profiles for the touch input device 118.

Figure 5:
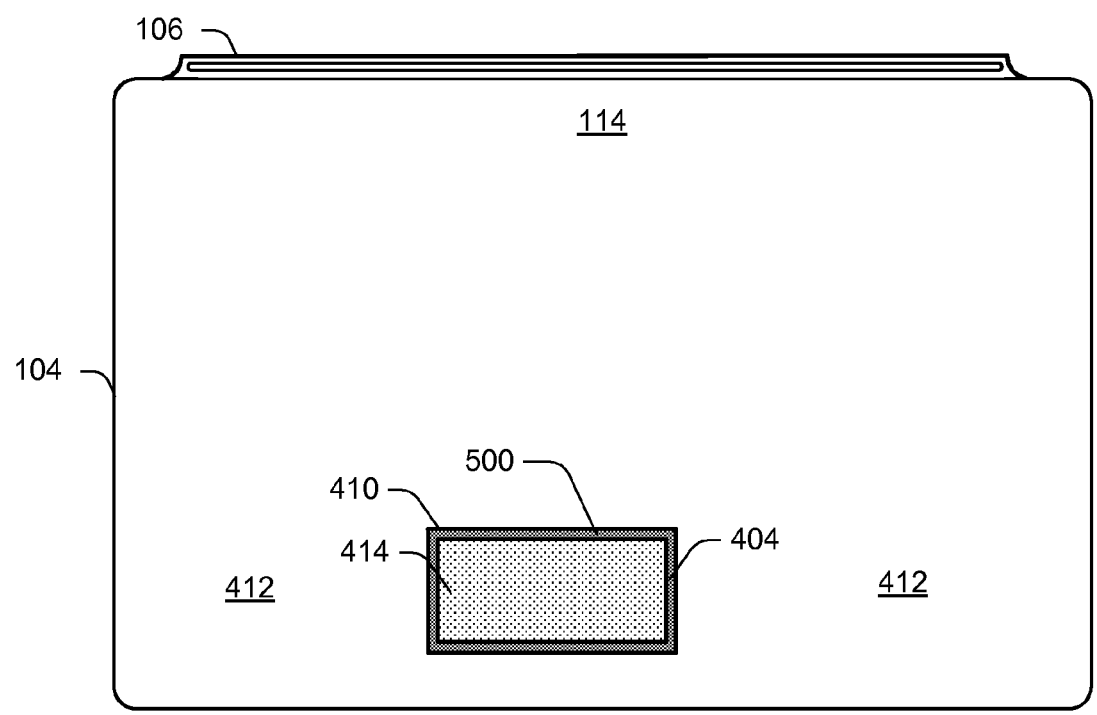
FIG. 5 depicts an example top view of a touch input device in accordance with one or more embodiments.

FIG. 5 illustrates a top view of the top surface 114 of the input device 104 without the fabric layer 402. The view presented in FIG. 5, for instance, depicts the input device 104 prior to being laminated with the fabric layer 402. As illustrated, the input device 104 is separate (e.g., detached) from the computing device 102 discussed above. Thus, in at least some implementations, the input device 104 may be implemented as a standalone input device that may attach and/or communicatively associate with a variety of different computing devices. For instance, the flexible hinge 106 includes an attachment mechanism that enables attachment to a computing device, such as via a plug, a clip, magnets, and so forth. Alternatively or additionally, the input device 104 may include wireless functionality that enables wireless communication with an associated computing device such that input may be provided by the input device 104 to the computing device independent of a physical connection.

Further illustrated are the bezel 412 surrounding the mounting cavity 410. Consider for purposes of this example that the touch input device 118 is mounted within the mounting cavity 410, as discussed above.

As illustrated in FIG. 5, a gap 500 exists between the adhesive layer 414 and the periphery of the mounting cavity 410, e.g., surrounding portions of the bezel 412. In at least some implementations, the gap portions 416a, 416b introduced above represent side views of portions of the gap 500. Viewable within the gap 500 are exterior portions of the sensor substrate 404 that are not covered by the adhesive layer 414.

According to various implementations, when the fabric layer 402 is laminated over the top surface 114, the gap 500 persists between the adhesive layer 414 and the bezel 412. The gap 500 may represent a void (e.g., an air gap) between the adhesive layer 414 and the bezel 412. Alternatively or additionally, the gap 500 may be filled with one or more materials, such as flexible foam, soft rubber, silicone, and so forth. The gap 500, for instance, may be filled with a material that is softer (e.g., more easily compressed) than the adhesive layer 414. As further detailed below, this enables the touch input device 118 to be more easily actuated via user input than if the gap 500 were not present.

While the input device 104 may include various other functionalities (e.g., the keyboard 116), these are omitted in FIG. 5 for purpose of discussion.

Figure 6:
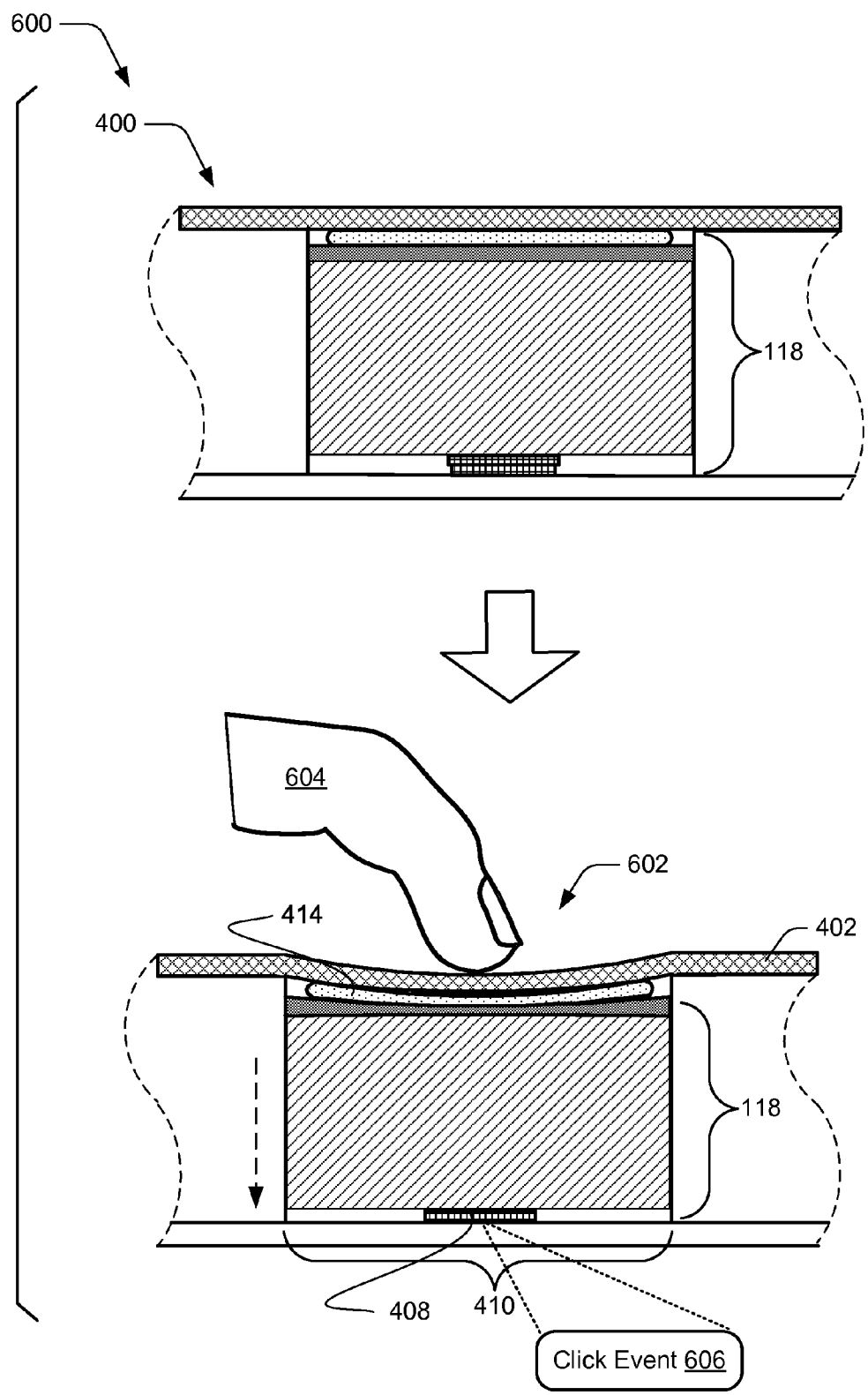
FIG. 6 illustrates an example implementation scenario for interacting with a touch input device in accordance with one or more embodiments.

FIG. 6 illustrates an example implementation scenario 600 for interacting with the touch input device 118 in accordance with one or more implementations. The upper portion of the scenario 600 includes the side section view 400 of the input device 104 introduced above with reference to FIG. 4, and various components of the touch input device 118 introduced above.

Proceeding to the lower portion of the scenario 600, a user provides a touch interaction 602 to the touch input device 118 via a finger 604. The user, for instance, applies downward force to a portion of the fabric layer 402 that overlays the touch input device 118. Pressure from the touch interaction 602 compresses the fabric layer 402 and thus applies pressure to the adhesive layer 414 and the underlying components of the touch input device 118. Accordingly, the touch input device 118 moves downward within the mounting cavity 410 and compresses the switch 408 to actuate the switch 408 and generate a click event 606. For instance, compressing the switch 408 past a threshold compression distance within the mounting cavity 410 causes the switch to "click" and generate the click event 606.

According to various implementations, actuation of the switch 408 is associated with a threshold force that is applied to the fabric layer 402 overlaying the touch input device 118. In the scenario 600, for example, the touch interaction 602 exceeds the threshold force, and thus the switch 408 is actuated to generate the click event 606. If, however, a touch interaction with the fabric layer overlaying the touch input device 118 does not exceed the threshold force, the switch 408 is not actuated and thus the click event 606 is not generated.

The click event 606 generally represents an input event that can be communicated to various functionalities of the computing device 102. Examples of the click event 606 include a selection event (e.g., to select a control displayed on an associated computing device), a power-related event (e.g., to switch between different device power states), a notification event (e.g., to communicate a notification to an entity and/or functionality), and so forth. In at least some implementations, actuating the switch 408 causes the switch 408 to generate an audible click and/or snap that indicates that the click event 604 is generated.

According to one or more implementations, the switch 408 includes an elastic mechanism (e.g., a spring, an elastic material, and so forth) that applies positive upward pressure upon the sensor circuity 406 and other components of the touch input device 118. Alternatively or additionally, the elastic mechanism may apply power downward pressure against the bottom portion of the mounting cavity 410. Accordingly, to cause the switch 408 to generate the click event 606, a user applies pressure against the upward and/or downward pressure applied by the switch 408 to cause the switch 408 to compress and generate the click event 606.

Thus, according to one or more implementations, the layering of the fabric layer 402 over the adhesive layer 414 and the underlying components of the touch input device 118 provides a moveable component stack that responds to user input in a variety of ways. For instance, as illustrated in the scenario 600, when a user provides input that exceeds a threshold input force on the touch input device 118, the touch input device 118 moves downward within the mounting cavity 410 and causes actuation of the switch 408 to generate the click event 606. As further detailed below, if user input to the touch input device 118 does not exceed the threshold input force, the switch 408 may not be actuated and thus the click event 606 may not be generated.

Figure 7:
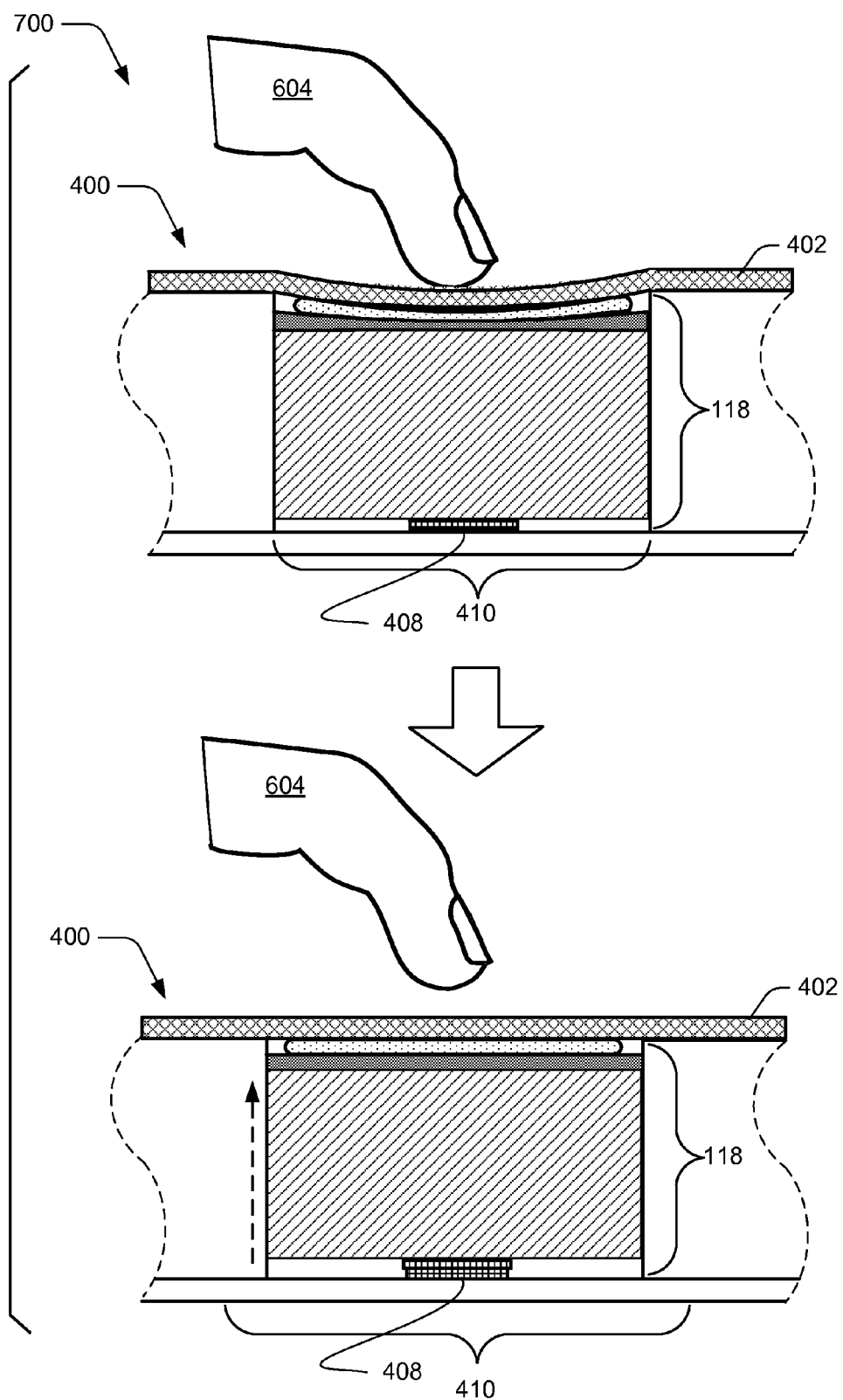
FIG. 7 illustrates an example implementation scenario for interacting with a touch input device in accordance with one or more embodiments.

FIG. 7 illustrates an example implementation scenario 700 for interacting with the touch input device 118 in accordance with one or more implementations. The upper portion of the scenario 700 includes the side section view 400 of the input device 104 and various components of the touch input device 118. Further illustrated is that the switch 408 is compressed such that the switch 408 is actuated, e.g., as discussed above with reference to FIG. 6.

Proceeding to the lower portion of the scenario 700, the user lifts their finger 604 such that pressure is released from the fabric layer 402 and underlying components of the touch input device 118. Accordingly, spring pressure from the switch 408 pushes other components of the touch input device 118 upward within the mounting cavity 410 such that the touch input device 118 returns to a default position, e.g., a resting position in which a user is not interacting with the touch input device 118. As referenced above, the switch 408 includes an elastic mechanism (e.g., a spring, an elastic material, and so forth) that applies positive upward pressure upon the sensor circuity 406 and other components of the touch input device 118, and/or positive downward pressure on the bottom portion of the mounting cavity 410. Thus, when a user releases pressure from the fabric layer 402 overlaying the touch input device 118, the switch 408 pushes the touch input device 118 upward to return to a default position. As illustrated, this causes the fabric layer 402 to return to a flat orientation such that the fabric layer 402 is no longer compressed.

Figure 8:
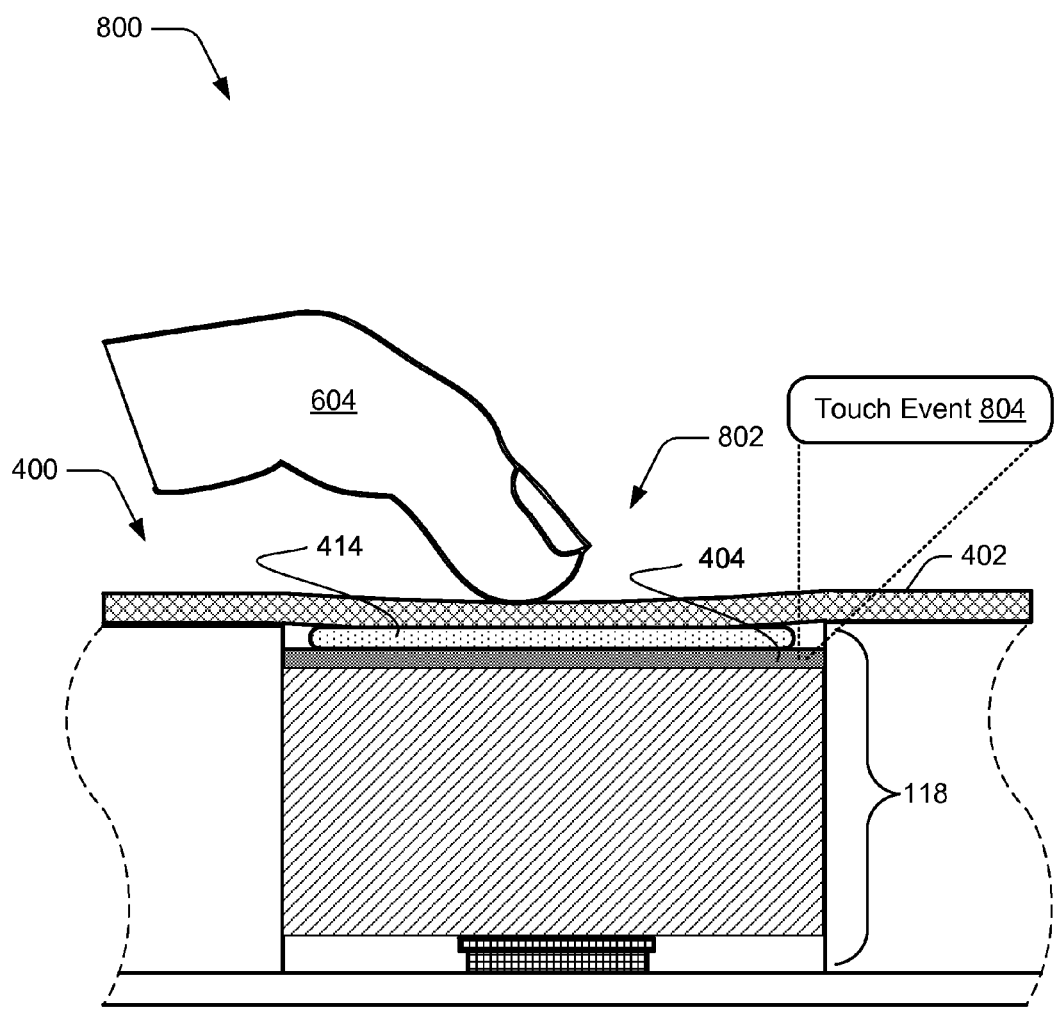
FIG. 8 illustrates an example implementation scenario for interacting with a touch input device in accordance with one or more embodiments.

FIG. 8 illustrates an example implementation scenario 800 for interacting with the touch input device 118 in accordance with one or more implementations. The scenario 800 includes the side section view 400 of the input device 104 and various components of the touch input device 118 introduced above.

In the scenario 800, a user provides a touch interaction 802 to the touch input device 118 via the finger 604. The user, for instance, applies downward force to a portion of the fabric layer 402 that overlays the touch input device 118. Pressure from the touch interaction 802 compresses the fabric layer 402 and thus applies pressure to the adhesive layer 414 and the sensor substrate 404. However, in the scenario 800, the force applied by the user as part of the touch interaction 802 does not exceed a threshold force that causes the switch 408 to compress and generate a click event, such as discussed above with reference to the scenario 600.

For instance, in the scenario 800, the user rests the finger 604 on the fabric layer 402 overlaying the sensor substrate 404 and moves the finger 604 around while maintaining contact with the fabric layer 402. Accordingly, the sensor substrate 404 detects the touch input 802 and generates a touch event 804. In at least some implementations, the sensor substrate 404 includes capacitive and/or resistive touch sensors that detect the touch input 802. The sensor substrate 404, for instance, comprises a membrane that covers touch sensors for receiving touch input. The membrane may be made from various materials, such as Mylar®, rubber, plastic film, and so forth.

Generally, the touch event 804 corresponds to an input event that is generated when touch input is received via the sensor substrate 404. For example, when a user provides a touch interaction to the fabric layer 402 overlaying the touch input device 118 that exceeds a threshold downward force such that the switch 408 is actuated (e.g., the touch input 602), a click event is generated such as discussed above with reference to FIG. 6. However, if a touch interaction does not exceed the threshold downward force such that the switch 408 is actuated (e.g., the touch interaction 802), the touch event 804 is generated. In at least some implementations, the touch event 804 is interpreted as a different type of input event than the click event 606 introduced above. For instance, the click event 606 may be utilized for selection, and the touch event 804 may be utilized for movement. The touch event 804, for example, may cause movement of a cursor and/or other icon on a display region, such as on the display 110 of the computing device 102.

Accordingly, the scenarios 600-800 demonstrate example implementations where different interactions and different forces applied to the touch input device 118 generate different types of input events.

Figure 9:
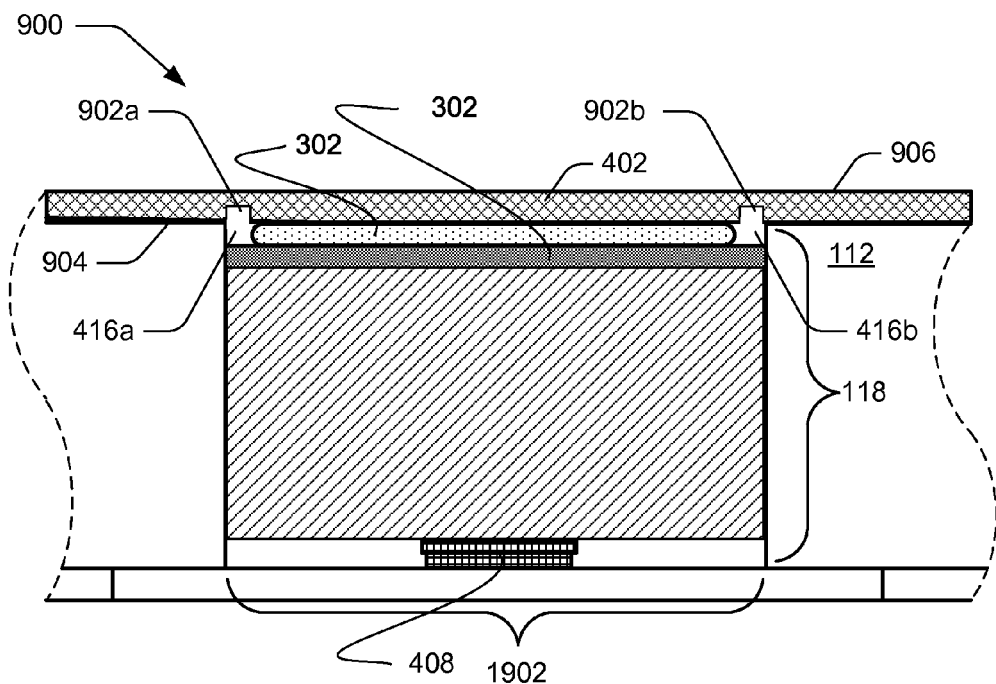
FIG. 9 depicts an example side view of a touch input device in accordance with one or more embodiments.

FIG. 9 illustrates a side section view 900 of the input device 104 and various components of the touch input device 118 introduced above. In at least some implementations, the side section view 900 represents a variation of the side section view 400 introduced above.

Further illustrated are a channel 902a and a channel 902b that are formed in an underside 904 of the fabric layer 402. For instance, the channels 902a, 902b represent portions of the underside 904 of the fabric layer 402 that are removed via etching into the underside 904. The channels 902a, 902b, for example, may be formed via any suitable etching and/or ablating technique, such as laser, chemical, heat, mechanical, and so forth. Alternatively, the channels 902a, 902b may be formed via layering of different portions of fabric to form the fabric layer 402. According to various implementations, the channels 902a, 902b do not perforate a top surface 906 of the fabric layer 402. Accordingly, the channels 902a, 902b represent portions of the fabric layer 402 that are thinner than other portions of the fabric layer 402.

In at least some implementations, the channels 902a, 902b are positioned above (e.g., directly above) the gap portions 416a, 416b, respectively. According to various implementations, the channels 902a, 902b reduce the resistance of the fabric layer 402 to downward movement over the touch input device 118, e.g., as compared to an implementation in which the channels 902a, 902b are not formed in the fabric layer 402. For instance, the channels 902a, 902b reduce the threshold force for generating the touch event 804 and/or the click event 606 as compared to an implementation in which the channels 902a, 902b are not formed in the fabric layer 402.

According to one or more implementations, the channels 902a, 902b represent different portions of a common channel. Alternatively, the channels 902a, 902b represent different separate portions in the underside 904.

Figure 10:
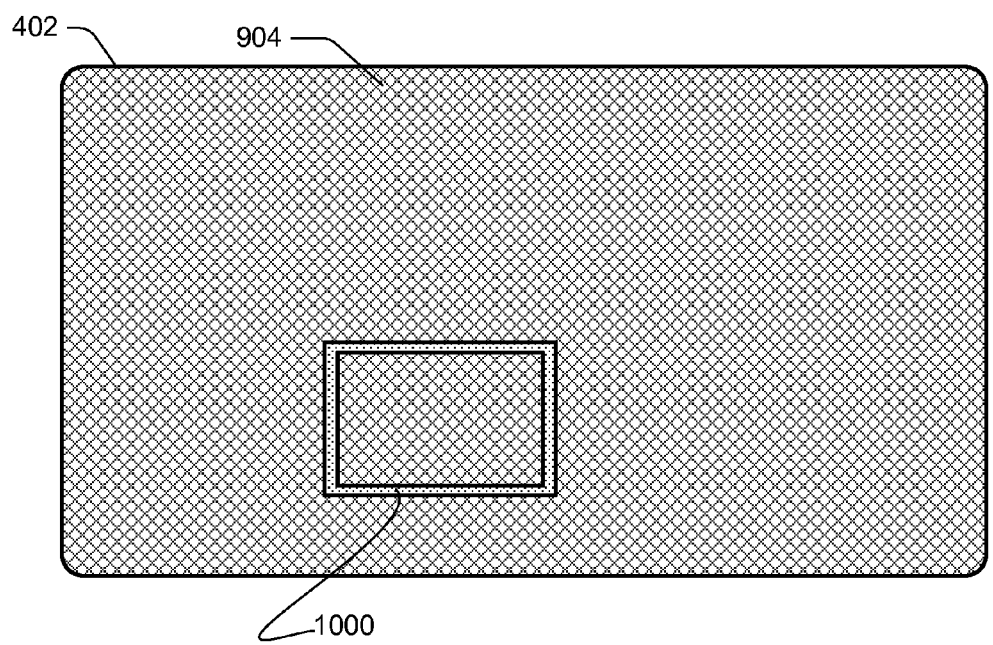
FIG. 10 depicts a bottom view of an underside of a fabric layer in accordance with one or more embodiments.

FIG. 10 illustrates a bottom view of the underside 904 of the fabric layer 402 in accordance with one or more implementations. The view presented in FIG. 10, for instance, represents the fabric layer 402 prior to lamination on the input device 104.

Further illustrated is a channel 1000 formed in the underside 904. The channels 902a, 902b introduced above, for instance, represent portions of the channel 1000. Generally, the channel 1000 is formed in the underside 904 without perforating the top surface 906 of the fabric layer 402, such as discussed above with reference to FIG. 9.

In at least some implementations, the channel 1000 represents a continuous channel that is formed (e.g., etched and/or layered) in the underside 904. Alternatively, the channel 1000 may be comprised of multiple sub-channels that are separated by portions of the fabric layer 402 and/or other materials. According to various implementations, the channel 1000 is positioned on the underside 904 such that when the fabric layer 402 is laminated to the input device 104, the channel 1000 is positioned above (e.g., directly above) the touch input device 118. For instance, when the fabric layer 402 is laminated to the input device 104, the channel 1000 is positioned directly above the gap 500 introduced above with reference to FIG. 5.

According to various implementations, the channel 1000 enables resistance of the fabric layer 402 to downward movement over the touch input device 118 to be controlled, e.g., reduced. For instance, the channel 1000 enables resistance of the fabric layer 402 to downward movement over the touch input device 118 to be reduced as compared to an implementation in which the channel 1000 is not etched into the fabric layer 402. Forming the channel 1000 in the underside 904, for example, reduces the threshold force for generating the touch event 804 and/or the click event 606 as compared to an implementation in which the channel 1000 is not formed in the fabric layer 402.

Figure 11:
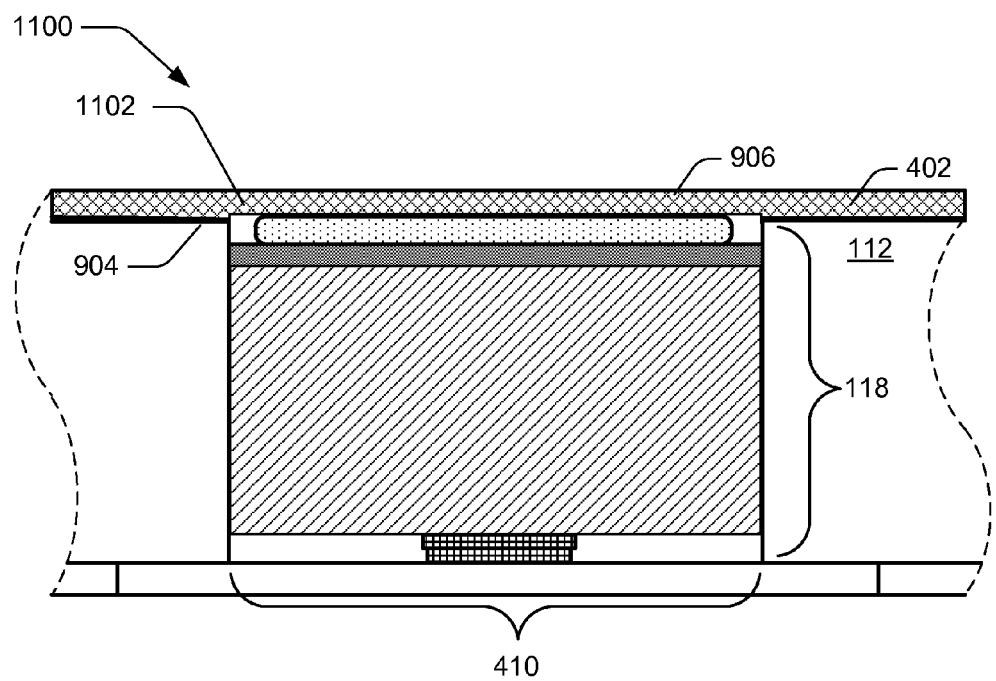
FIG. 11 depicts an example side view of a touch input device accordance with one or more embodiments.

FIG. 11 illustrates a side section view 1100 of the input device 104 and various components of the touch input device 118 introduced above. In at least some implementations, the side section view 1100 represents a variation of the side section view 400 introduced above.

Further illustrated is a thin region 1102 in the underside 904 of the fabric layer 402. According to various implementations, the thin region 1102 corresponds to a portion of the fabric layer 402 above the touch input device 118 that is thinner than other portions of the fabric layer 402. For instance, the thin region 1102 represents portions of the underside 904 that are removed without perforating the top surface 906 of the fabric layer 402. Alternatively or additionally, the thin region 1102 may be formed via layering of the different layers to form the thin region 1102 within the fabric layer 402. Thus, the thin region 1102 is thinner than other portions of the fabric layer 402, e.g., than above the bezel 412.

According to one or more implementations, the thin region 1102 is of the same width as the mounting cavity 410, or slightly less in width than the mounting cavity 410.

Generally, the thin region 1102 enables resistance of the fabric layer 402 to downward movement over the touch input device 118 to be controlled, e.g., reduced. For instance, the thin region 1102 enables resistance of the fabric layer 402 to downward movement over the touch input device 118 to be reduced as compared to an implementation in which the thin region 1102 is not formed into the fabric layer 402. Forming the thin region 1102 into the underside 902, for example, reduces the threshold force for generating the touch event 802 and/or the click event 604 as compared to an implementation in which the thin region 1102 is not formed into the fabric layer 402. In one or more implementations, the thin region 1102 presents an alternative or additional implementation scenario to utilizing the channels described above.

Figure 12:
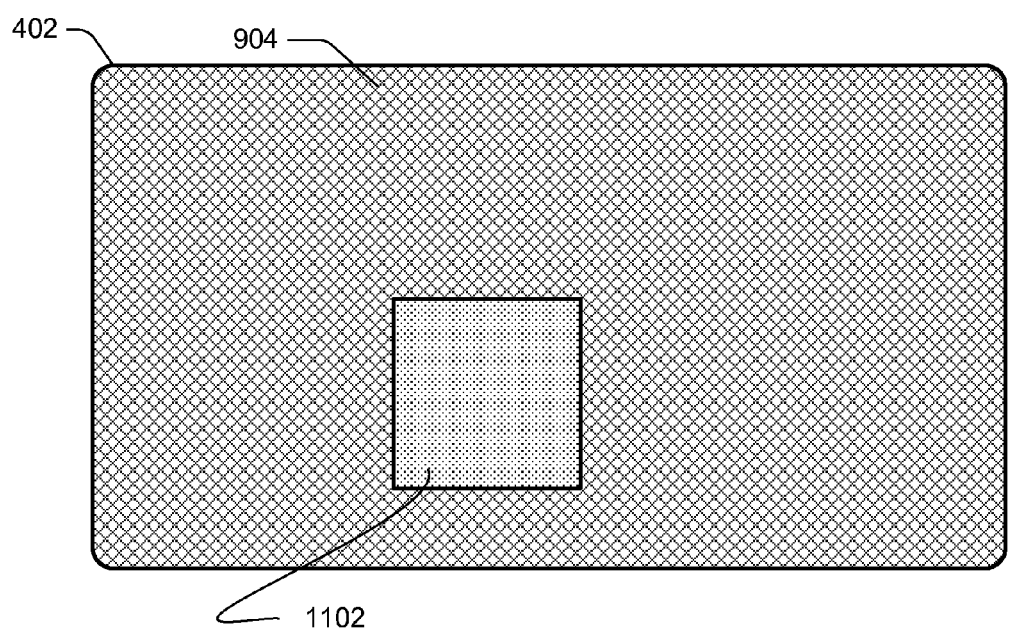
FIG. 12 depicts a bottom view of an underside of a fabric layer in accordance with one or more embodiments.

FIG. 12 illustrates a bottom view of the underside 904 of the fabric layer 402 in accordance with one or more implementations. The view presented in FIG. 12, for instance, represents the fabric layer 402 prior to lamination on the input device 104.

Further illustrated is the thin region 1102 formed in the underside 904. The thin region 1102, for instance, represents a portion of the underside 904 that is etched and/or layered in the underside 904 without perforating the top surface 906 of the fabric layer 402, such as discussed above with reference to FIG. 11. As illustrated, the thin region 1102 represents a continuous region that is formed via removal of portion of the underside 904 of the fabric layer 402, or by layering of different layers in forming the fabric layer 402.

According to various implementations, the thin region 1102 is positioned on the underside 904 such that when the fabric layer 402 is laminated to the input device 104, the thin region 1102 is positioned above (e.g., directly above) the touch input device 118. For instance, when the fabric layer 402 is laminated to the input device 104, the peripheral edges of the thin region 1102 are aligned with the perimeter of the mounting cavity 410, discussed above. As referenced above, the thin region 1102 enables a resistance profile of the fabric layer 402 above the touch input device 118 to be controlled.

Figure 13:
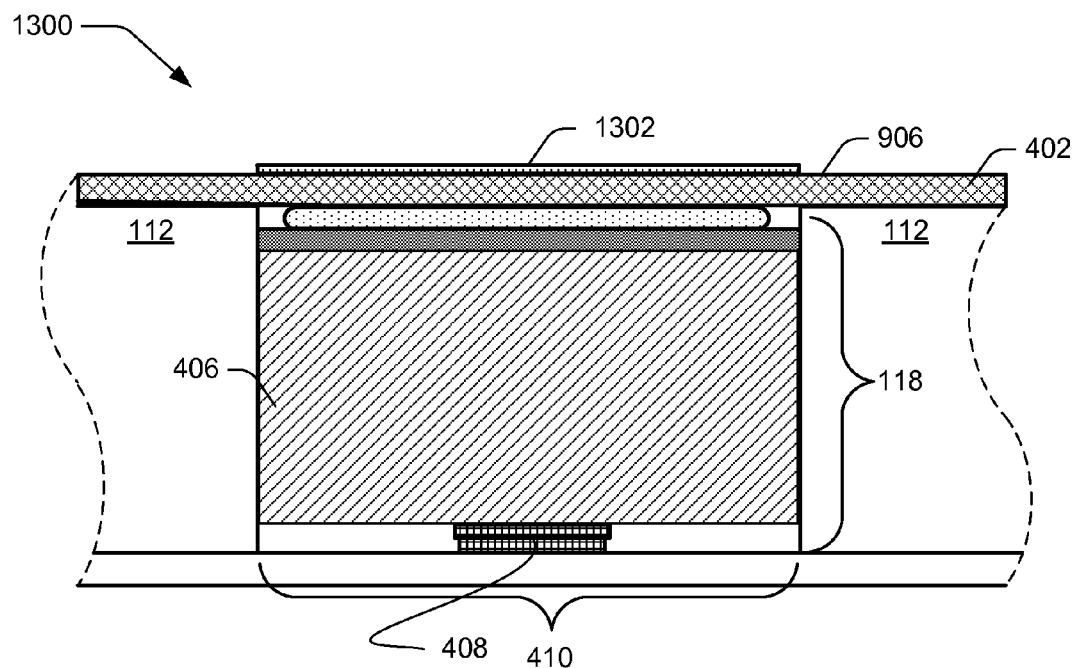
FIG. 13 depicts an example side view of a touch input device in accordance with one or more embodiments.

FIG. 13 illustrates a side section view 1300 of the input device 104 and various components of the touch input device 118 introduced above. In at least some implementations, the side section view 1300 represents a variation of the side section view 400 introduced above. Further illustrated is an input surface 1302 that is attached to the top surface 906 of the fabric layer 402. Generally, the input surface 1302 represents a material and/or combination of materials that is laminated to and/or impregnated within the top surface 906.

According to various implementations, the input surface 1302 is formed from a different material than the fabric layer 402. The input surface 1302, for instance, has a lower coefficient of friction (COF) with an input mechanism (e.g., a user's finger) than does the fabric layer 402. For example, the input surface 1302 may be more slippery than other portions of the fabric layer 402, thus decreasing the resistance to user movement across the input surface 1302, such as during touch input to the touch input device 118. In at least some implementations, the input surface 1302 may decrease user discomfort that may occur during touch interactions with the touch input device 118, such as that may occur when a user drags their finger across the fabric layer 402 above the touch input device 118.

According to various implementations, the length and width of the input surface 1302 may be the same as the length and width of the mounting cavity 410. Alternatively, the length and width of the input surface 1302 may be slightly smaller or slightly larger than the length and width of the mounting cavity 410. Thus, the input surface 1302 may be positioned directly above the touch input device 118 and may provide a target input zone for a user to provide input to the touch input device 118.

In at least some implementations, the input surface 1302 may be colored and/or textured differently than surrounding portions of the fabric layer 402, thus visually distinguishing regions of the fabric layer 402 that a user may interact with to provide input to the touch input device 118.

Figure 14:
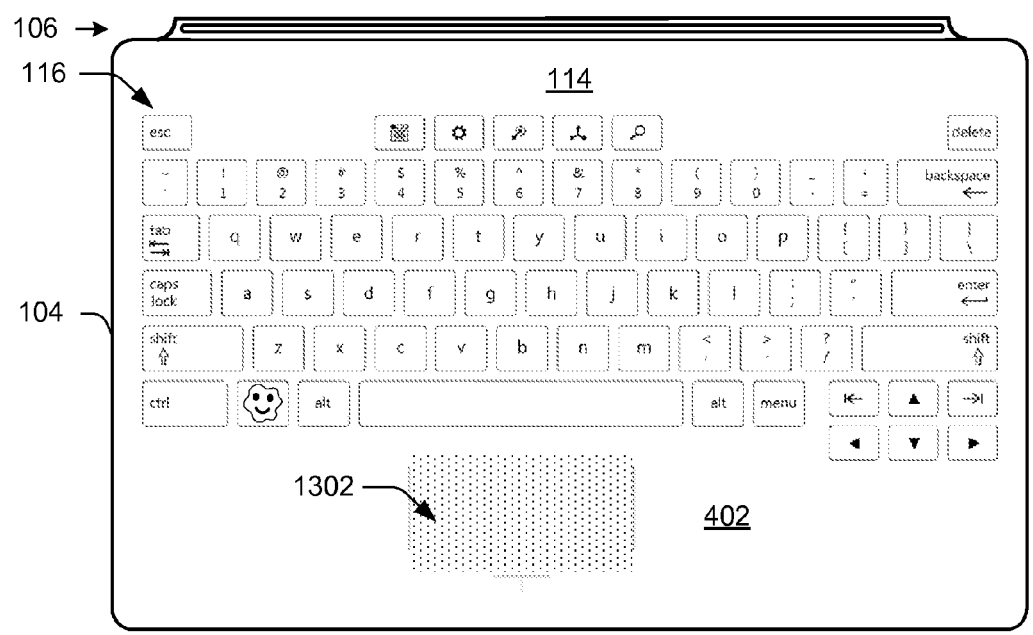
FIG. 14 depicts a facing view of a top surface of an input device laminated with the fabric layer in accordance with one or more embodiments.

FIG. 14 illustrates a facing view of the top surface 114 of the touch input device 104 laminated with the fabric layer 402 in accordance with one or more implementations. Further illustrated is the input surface 1302 positioned above the touch input device 118. As illustrated, the input surface 1302 has a different texture than surrounding portions of the fabric layer 402. As mentioned above, the input surface 1302 may provide less resistance to user interaction (e.g., touch interaction) such that less friction is experienced when interacting the input surface 1302 than is experienced when interaction with other portions of the fabric layer 402.

Figure 15:
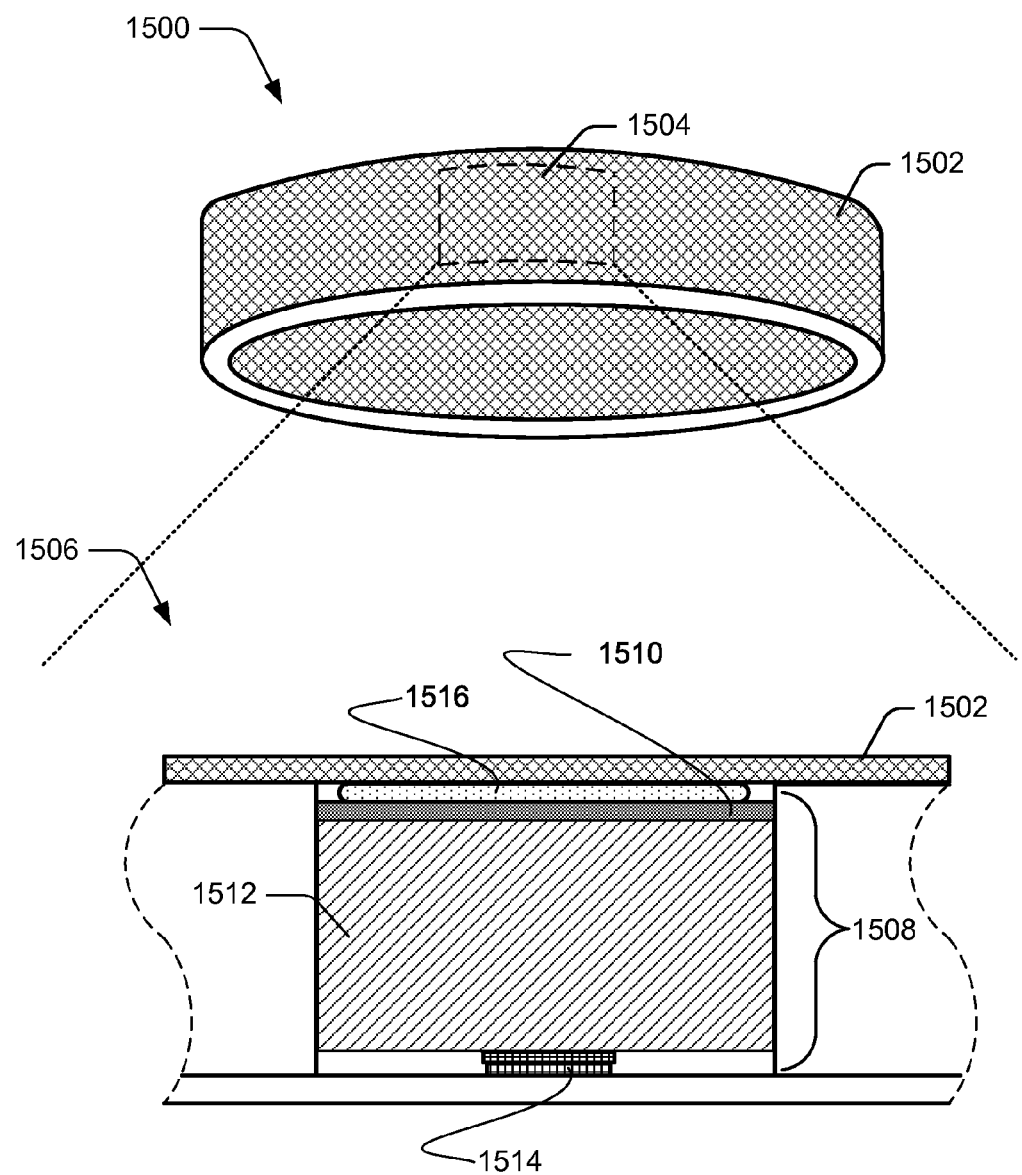
FIG. 15 depicts an example wearable device in accordance with one or more embodiments.

FIG. 15 illustrates an example wearable device 1500 according to one or more implementations. The wearable device 1500 is laminated with a fabric layer 1502 on one or more exterior surfaces, and includes an input region 1504 on its outer surface. The fabric layer 1502 may be implemented in various ways, such as described above with reference to the fabric layer 402. Generally, the input region 1504 corresponds to a portion of the wearable device 1500 to which input may be provided, such as touch-based input. The input portion region is depicted within the dashed lines for purpose of example only, and it is to be appreciated that the input region 1504 may not be visually discernable from other portions of the fabric layer 1502. The fabric layer 1502, for instance, may be implemented as a continuous layer of fabric that covers outer and/or inner surfaces of the wearable device 1500. Thus, the fabric layer 1502 may be continuous (e.g., uncut) across the surface of the input region 1504. Alternatively or additionally, a different portion of material may be laminated on the fabric layer 1502 above the input region 1504, such as described with reference to the input surface 1302 discussed above. Thus, in at least some implementations, the input region 1504 may be visually distinguishable from other portions of the fabric layer 1502.

Further illustrated in FIG. 15 is a side cross-section view 1506 of the wearable device 1500. Generally, the cross-section view 1506 represents a cross-section of the wearable device beneath the input region 1504. Illustrated as part of the cross-section view 1506 is the fabric layer 1502 laminated over a touch input device 1508. The touch input device 1508 includes a sensor substrate 1510, sensor circuitry 1512, and a switch 1514. Further, the fabric layer 1502 is attached to the sensor substrate 1510 via an adhesive layer 1516. According to various implementations, the touch input device 1508 represents an implementation of the touch input device 118 described above. Accordingly, in one or more implementations, the various details and implementation variations described above with reference to the touch input device 118 also pertain to the touch input device 1508.

Although the wearable device 1500 is illustrated as a "smart watch" form factor, it is to be appreciated that implementations for fabric laminated touch input device described herein apply to a wide variety of different form factors, wearable and otherwise.

Figure 16:
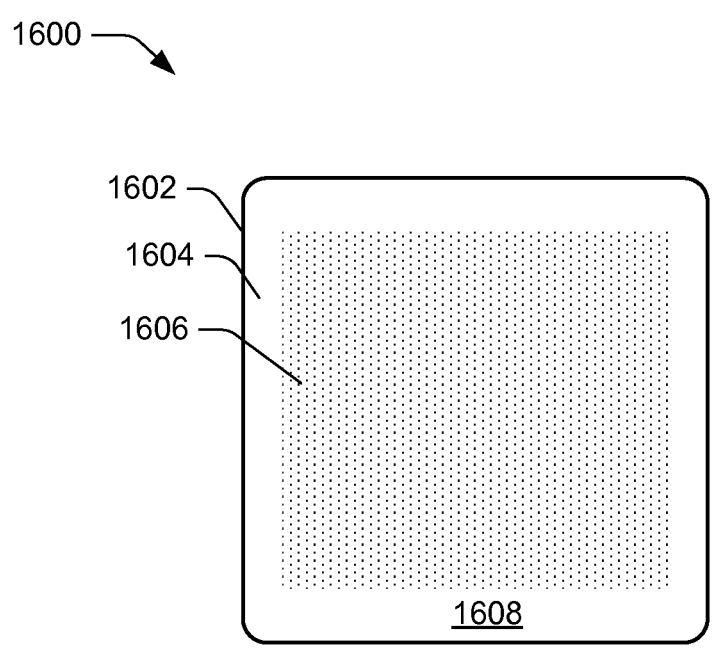
FIG. 16 depicts an example peripheral touch input device in accordance with one or more embodiments.

FIG. 16 illustrates an example peripheral touch input device 1600 in accordance with one or more implementations. The peripheral touch input device 1600 is representative of an external peripheral device that can be communicatively associated with various devices via a wired and/or wireless connection. For instance, the peripheral touch input device 1600 represents an external peripheral device that can be communicatively associated with a variety of different types of computing devices to provide touch input to the computing devices.

The peripheral touch input device 1600 includes a chassis 1602 with a bezel 1604 and a touch input region 1606. The bezel 1604 and the touch input region 1606 are laminated with a fabric layer 1608. According to one or more implementations, the peripheral touch input device 1600 includes the various touch input device components and attributes discussed above. For instance, the peripheral touch input device 1600 includes the touch input device 118 within the chassis 1602 and beneath the touch input region 1606. Accordingly, the peripheral touch input device 1600 represents a portable touch input device that may be utilized in a variety of different scenarios to provide touch input to a computing device.

While the example implementations described above are discussed separately, it is to be appreciated that the implementations may be combined in various ways. For instance, the implementations described with reference to FIGS. 9-12 may be combined with one another in various ways. Further, one or more of the implementations described with reference to FIGS. 9-12 may be combined with the input surface implementation described with reference to FIG. 13 in various ways. These combinations are not intended to be limiting, and it is to be appreciated that implementations described herein may be combined and interchanged to provide a variety of different implementations while remaining within the spirit and scope of the described and/or claimed implementations.

Further, while implementations are discussed with reference to a touchpad scenario, it is to be appreciated that the touch input device 118, the touch input device 1508, and/or the peripheral touch input device 1600 may be implemented in a variety of ways, such as individual keys of a keyboard, input devices on various types of apparatus, and so forth. For instance, the touch input device 118 and/or the touch input device 1508 may be implemented as individual keys of the keyboard 116 of the input device 104.

Having discussed some example implementations for fabric laminated touch input device, consider now an example system and device in accordance with one or more implementations.

Example System and Device

Figure 17:
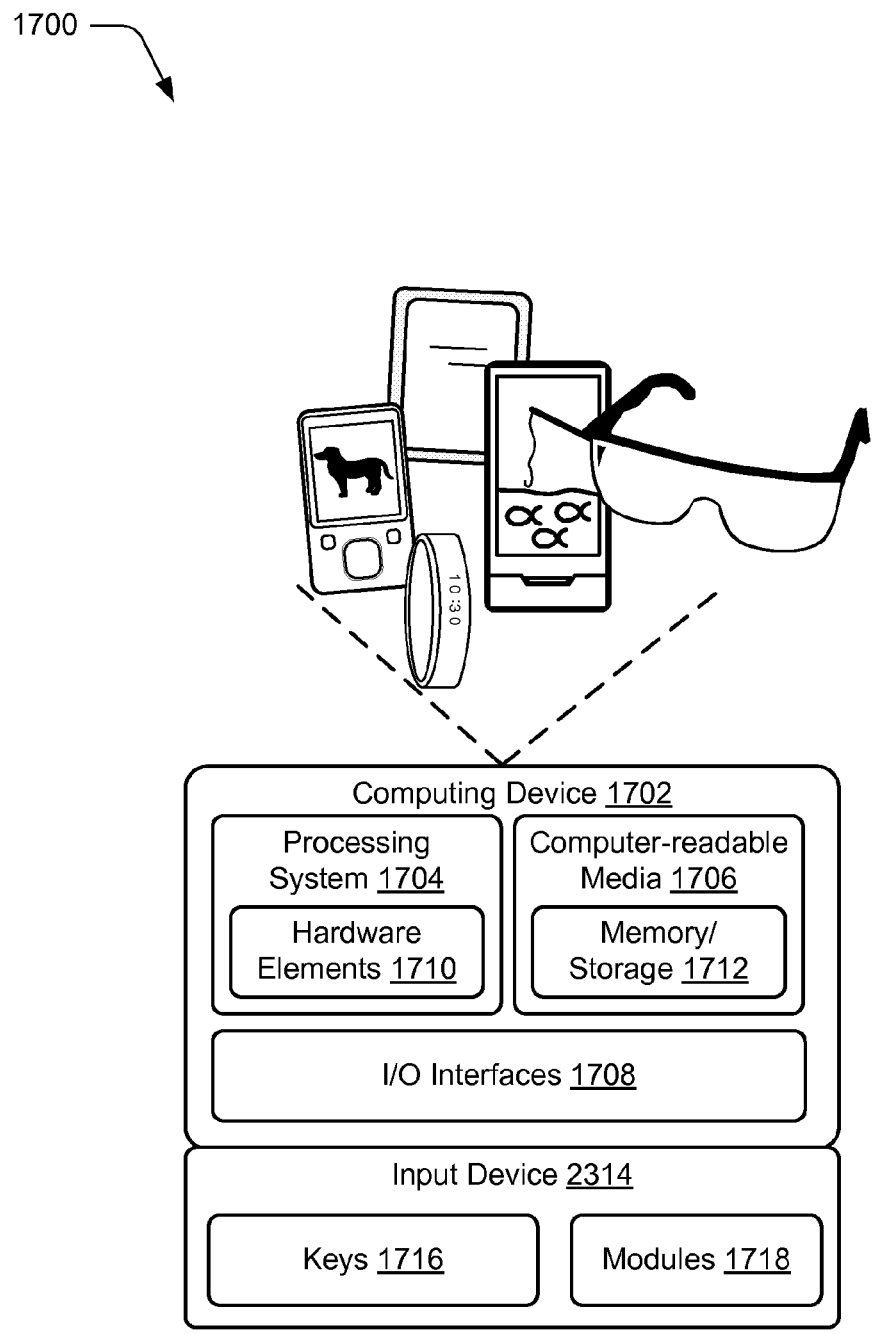
FIG. 17 illustrates an example system and device that can be employed to implement embodiments of the techniques described herein in accordance with one or more embodiments.

FIG. 17 illustrates an example system generally at 1700 that includes an example computing device 1702 that is representative of one or more computing systems and/or devices that may implement the various techniques described herein. In at least some implementations, the computing device 1702 represents an implementation of the computing device 102 discussed above. The computing device 1702 may be, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the computing device 102 may be implemented as a wearable device, such as a smart watch, smart glasses, and so forth.

The example computing device 1702 as illustrated includes a processing system 1704, one or more computer-readable media 1706, and one or more I/O interface 1708 that are communicatively coupled, one to another. Although not shown, the computing device 1702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1704 is representative of functionality to perform one or more operations using hardware. Accordingly, the processing system 1704 is illustrated as including hardware element 1710 that may be configured as processors, functional blocks, and so forth. This may include implementation in hardware as an application specific integrated circuit or other logic device formed using one or more semiconductors. The hardware elements 1710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1706 is illustrated as including memory/storage 1712. The memory/storage 1712 represents memory/storage capacity associated with one or more computer-readable media. The memory/storage component 1712 may include volatile media (such as random access memory (RAM)) and/or nonvolatile media (such as read only memory (ROM), Flash memory, optical disks, magnetic disks, and so forth). The memory/storage component 1712 may include fixed media (e.g., RAM, ROM, a fixed hard drive, and so on) as well as removable media (e.g., Flash memory, a removable hard drive, an optical disc, and so forth). The computer-readable media 1706 may be configured in a variety of other ways as further described below.

Input/output interface(s) 1708 are representative of functionality to allow a user to enter commands and information to computing device 1702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1702 may be configured in a variety of ways to support user interaction.

The computing device 1702 is further illustrated as being communicatively and physically coupled to an input device 1714 that is physically and communicatively removable from the computing device 1702. In this way, a variety of different input devices may be coupled to the computing device 1702 having a wide variety of configurations to support a wide variety of functionality. In this example, the input device 1714 includes one or more keys 1716, which may be configured as pressure sensitive keys, mechanically switched keys, and so forth.

The input device 1714 is further illustrated as include one or more modules 1718 that may be configured to support a variety of functionality. The one or more modules 1718, for instance, may be configured to process analog and/or digital signals received from the keys 1716 to determine whether a keystroke was intended, determine whether an input is indicative of resting pressure, support authentication of the input device 1714 for operation with the computing device 1702, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1702. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media does not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1710 and computer-readable media 1706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1710. The computing device 1702 may be configured to implement particular instructions and/or functions corresponding to the software and/or hardware modules. Accordingly, implementation of a module that is executable by the computing device 1702 as software may be achieved at least partially in hardware, e.g., through use of computer-readable storage media and/or hardware elements 1710 of the processing system 1704. The instructions and/or functions may be executable/operable by one or more articles of manufacture (for example, one or more computing devices 1702 and/or processing systems 1704) to implement techniques, modules, and examples described herein.

1. An example apparatus including: a chassis; a touch input device mounted within the chassis and including a sensor substrate and a switch; and a fabric layer laminated over the sensor substrate such that touch input is receivable by the touch input device responsive to touch interaction with the fabric layer over the sensor substrate, the touch input device configured such that touch interaction with the fabric layer over the sensor substrate that exceeds a threshold force causes the switch to generate a click input event, and touch interaction with the fabric layer over the sensor substrate that does not exceed the threshold force causes the sensor substrate to generate a touch input event.

2. The example apparatus 1, wherein the apparatus includes an input device operably attached to a computing device.

3. The example apparatus of any of the preceding examples 1 or 2, wherein the apparatus includes a wearable device.

4. The example apparatus of any of the preceding examples 1-3, wherein touch input device is configured such that touch interaction with the fabric layer over the sensor substrate that exceeds the threshold force causes an audible click.

5. The example apparatus of any of the preceding examples 1-4, wherein the fabric layer is laminated over the sensor substrate via an adhesive layer that partially covers the sensor substrate.

6. The example apparatus of any of the preceding examples 1-5, wherein the fabric layer is laminated over the sensor substrate via an adhesive layer that at least partially covers the sensor substrate such that at least one of: a gap exists between an edge of the adhesive layer and an adjacent edge of the chassis; or at least a portion of a periphery of the adhesive layer is thinner than an inner portion of the adhesive layer.

7. The example apparatus of any of the preceding examples 1-6, wherein the chassis includes a bezel portion that is adjacent to the touch input device and that is at least partially laminated with the fabric layer, and wherein at least a portion of the fabric layer that overlays the sensor substrate is thinner than one or more portions of the fabric layer that overlay the bezel portion.

8. The example apparatus of any of the preceding examples 1-7, wherein the chassis includes a bezel portion that is adjacent to the touch input device and that is at least partially laminated with the fabric layer, and wherein at least a portion of the fabric layer that overlays the sensor substrate includes an input surface that is textured differently than one or more surface portions of the fabric layer that overlay the bezel portion.

9. An example input device including: a chassis; a touch input sensor mounted on or within an outer surface of the chassis; a bezel region that represents portions of the outer surface of the chassis; and a fabric layer that is laminated at least in part to the bezel region and the touch input sensor such that touch interaction with the fabric layer over the touch input sensor that exceeds a threshold force causes the touch input sensor to generate a click event.

10. The example input device 9, wherein the touch input sensor includes a sensor substrate to which the fabric layer is at least partially laminated, the sensor substrate being configured to cause a touch input event to be generated in response to a touch interaction with the fabric layer over the touch input sensor that does not exceed the threshold force.

11. The example input device of any of the preceding examples 9 or 10, wherein the fabric layer is laminated to the touch input sensor via an adhesive layer that partially covers the touch input sensor such that at least one of: a gap exists between an edge of the adhesive layer and an adjacent edge of the bezel; or at least a portion of a periphery of the adhesive layer is thinner than an inner portion of the adhesive layer.

12. The example input device of any of the preceding examples 9-11, wherein the touch input sensor is configured such that touch interaction with the fabric layer over the sensor substrate that exceeds the threshold force causes an audible click.

13. The example input device of any of the preceding examples 9-12, wherein the input device includes an external peripheral device that is configured to be communicatively coupled and uncoupled from a computing device.

14. The example input device of any of the preceding examples 9-13, wherein at least a portion of the fabric layer that overlays the sensor substrate is thinner than one or more portions of the fabric layer that overlay the bezel.

15. The example input device of any of the preceding examples 9-14, wherein at least a portion of the fabric layer that overlays the sensor substrate includes an input surface that is textured differently than one or more surface portions of the fabric layer that overlay the bezel.

16. An apparatus including: a chassis including a mounting cavity surrounded by a bezel region; a touch input device moveably mounted within the mounting cavity, the touch input device including a sensor substrate, sensor circuitry, and a switch; and a fabric layer laminated at least in part to the bezel region and covering the sensor substrate such that touch interaction with the fabric layer covering the sensor substrate that exceeds a threshold force causes the sensor substrate and the sensor circuitry to move within the mounting cavity and actuate the switch to generate a click event.

17. The example apparatus 16, wherein the apparatus includes an external peripheral device.

18. The example apparatus of any of the preceding examples 16 or 17, wherein the apparatus includes a wearable device.

19. The example apparatus of any of the preceding examples 16-18, wherein the sensor substrate is configured to cause a touch input event to be generated in response to a touch interaction with the fabric layer over the touch input device that does not exceed the threshold force.

20. The example apparatus of any of the preceding examples 16-19, wherein the fabric layer seals the touch input device within the mounting cavity.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising:
   a chassis including a bezel portion;
   a touch input device mounted within the chassis adjacent the bezel portion and including a sensor substrate and a switch; and
   a fabric layer laminated over the sensor substrate and at least partially laminated over the bezel portion, at least a portion of the fabric layer that overlays the sensor substrate being thinner than a portion of the fabric layer that overlays the bezel, such that touch input is receivable by the touch input device responsive to touch interaction with the fabric layer over the sensor substrate, the touch input device configured such that touch interaction with the fabric layer over the sensor substrate that exceeds a threshold force causes the switch to generate a click input event, and touch interaction with the fabric layer over the sensor substrate that does not exceed the threshold force causes the sensor substrate to generate a touch input event.

2. An apparatus as recited in claim 1, wherein the apparatus comprises an input device operably attached to a computing device.

3. An apparatus as recited in claim 1, wherein the apparatus comprises a wearable device.

4. An apparatus as recited in claim 1, wherein touch input device is configured such that touch interaction with the fabric layer over the sensor substrate that exceeds the threshold force causes an audible click.

5. An apparatus as recited in claim 1, wherein the fabric layer is laminated over the sensor substrate via an adhesive layer that partially covers the sensor substrate.

6. An apparatus as recited in claim 1, wherein the fabric layer is laminated over the sensor substrate via an adhesive layer that at least partially covers the sensor substrate such that at least one of:
   a gap exists between an edge of the adhesive layer and an adjacent edge of the chassis; or
   at least a portion of a periphery of the adhesive layer is thinner than an inner portion of the adhesive layer.

7. An apparatus as recited in claim 1, wherein at least a portion of the fabric layer that overlays the sensor substrate includes an input surface that is textured differently than one or more surface portions of the fabric layer that overlay the bezel portion.

8. An apparatus as recited in claim 1, wherein the chassis includes a mounting cavity surrounded by the bezel portion and the fabric layer seals the touch input device within the mounting cavity.

9. An input device comprising:
   a chassis;
   a touch input sensor mounted on or within an outer surface of the chassis;
   a bezel region that represents portions of the outer surface of the chassis; and
   a fabric layer that is laminated at least in part to the bezel region and the touch input sensor such that touch interaction with the fabric layer over the touch input sensor that exceeds a threshold force causes the touch input sensor to generate a click event, at least a portion of the fabric layer that overlays the touch input sensor includes an input surface that is textured differently than one or more surface portions of the fabric layer that overlay the bezel region.

10. An input device as recited in claim 9, wherein the touch input sensor includes a sensor substrate to which the fabric layer is at least partially laminated, the sensor substrate being configured to cause a touch input event to be generated in response to a touch interaction with the fabric layer over the touch input sensor that does not exceed the threshold force.

11. An input device as recited in claim 9, wherein the fabric layer is laminated to the touch input sensor via an adhesive layer that partially covers the touch input sensor such that at least one of:
   a gap exists between an edge of the adhesive layer and an adjacent edge of the bezel region; or
   at least a portion of a periphery of the adhesive layer is thinner than an inner portion of the adhesive layer.

12. An input device as recited in claim 9, wherein the touch input sensor includes a sensor substrate, and wherein the touch input sensor is configured such that touch interaction with the fabric layer over the sensor substrate that exceeds the threshold force causes an audible click.

13. An input device as recited in claim 9, wherein the input device comprises an external peripheral device that is configured to be communicatively coupled and uncoupled from a computing device.

14. An input device as recited in claim 9, wherein the touch input sensor includes a sensor substrate, and wherein at least a portion of the fabric layer overlays the sensor substrate and is thinner than one or more portions of the fabric layer that overlay the bezel.

15. An apparatus comprising:
   a chassis including a mounting cavity surrounded by a bezel region;
   a touch input device moveably mounted within the mounting cavity, the touch input device including a sensor substrate, sensor circuitry, and a switch; and
   a fabric layer laminated at least in part to the bezel region and covering the sensor substrate such that touch interaction with the fabric layer covering the sensor substrate that exceeds a threshold force causes the sensor substrate and the sensor circuitry to move within the mounting cavity and actuate the switch to generate a click event, the fabric layer laminated at least in part to the bezel region via an adhesive layer such that at least one of:
   a gap exists between an edge of the adhesive layer and an adjacent edge of the chassis; or
   at least a portion of a periphery of the adhesive layer is thinner than an inner portion of the adhesive layer.

16. An apparatus as described in claim 15, wherein the apparatus comprises an external peripheral device.

17. An apparatus as described in claim 15, wherein the apparatus comprises a wearable device.

18. An apparatus as described in claim 15, wherein the sensor substrate is configured to cause a touch input event to be generated in response to a touch interaction with the fabric layer over the touch input device that does not exceed the threshold force.

19. An apparatus as described in claim 15, wherein the fabric layer seals the touch input device within the mounting cavity.

20. An apparatus as described in claim 15, wherein at least a portion of the fabric layer that overlays the sensor substrate is thinner than one or more portions of the fabric layer that overlays the bezel region.

\* \* \* \* \*